United States Patent [19]

Millonzi et al.

[11] 4,286,172
[45] Aug. 25, 1981

[54] SAFETY JUMPER CABLES

[76] Inventors: Anthony B. Millonzi, 1427 Jackson, River Forest, Ill. 60305; Joseph C. Millonzi, 4948 N. Neva, Chicago, Ill. 60656

[21] Appl. No.: 82,915

[22] Filed: Oct. 9, 1979

[51] Int. Cl.³ .................... H02J 7/34; H02G 11/00
[52] U.S. Cl. .................... 307/10 R; 307/326; 320/25
[58] Field of Search .............. 307/10 R, 10 BP, 326; 320/25

[56] References Cited

U.S. PATENT DOCUMENTS

| | | |
|---|---|---|
| 1,889,344 | 11/1932 | Bell . |
| 2,659,042 | 11/1953 | Anderson .................. 320/2 |
| 3,281,816 | 10/1966 | Raymond .................. 320/25 |
| 3,343,057 | 9/1967 | Smith .................. 320/25 |
| 3,700,834 | 10/1972 | Schaefer .................. 191/12.2 R |
| 3,942,027 | 3/1976 | Fima .................. 307/10 R |
| 4,166,241 | 8/1979 | Grant .................. 320/25 |

*Primary Examiner*—L. T. Hix
*Assistant Examiner*—Stafford D. Schreyer
*Attorney, Agent, or Firm*—Darbo & Vandenburgh

[57] ABSTRACT

Intermediate the ends of jumper cables for the batteries of automotive vehicles is a relay. The relay has normally open contacts which are closed when the relay solenoid is energized. The relay solenoid is connected in series with the relatively strong battery to which the jumper cables are connectable and a push button switch at the end of an additional cable extending from the relay.

1 Claim, 2 Drawing Figures

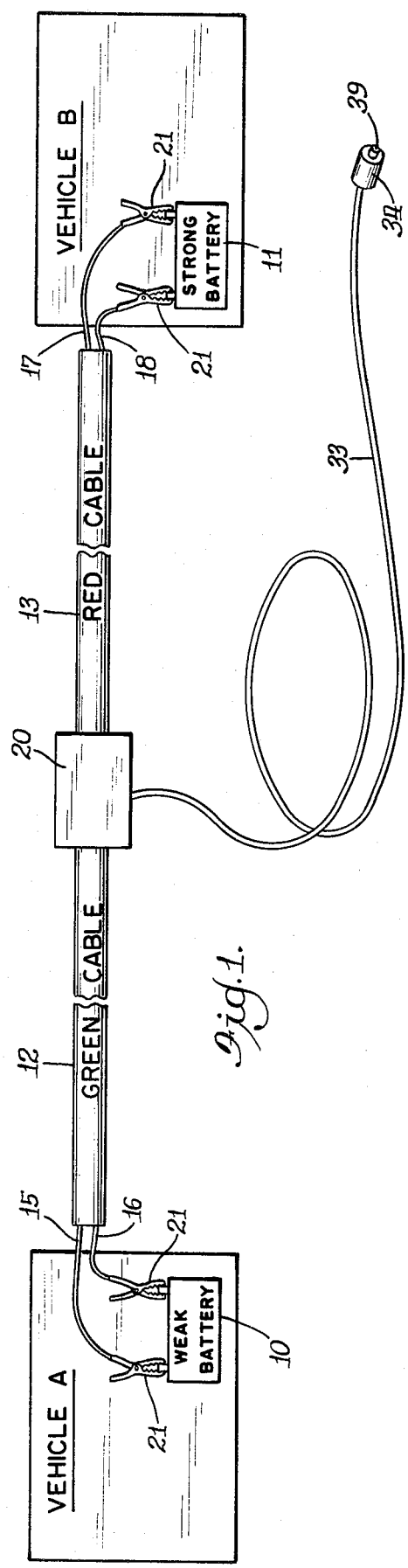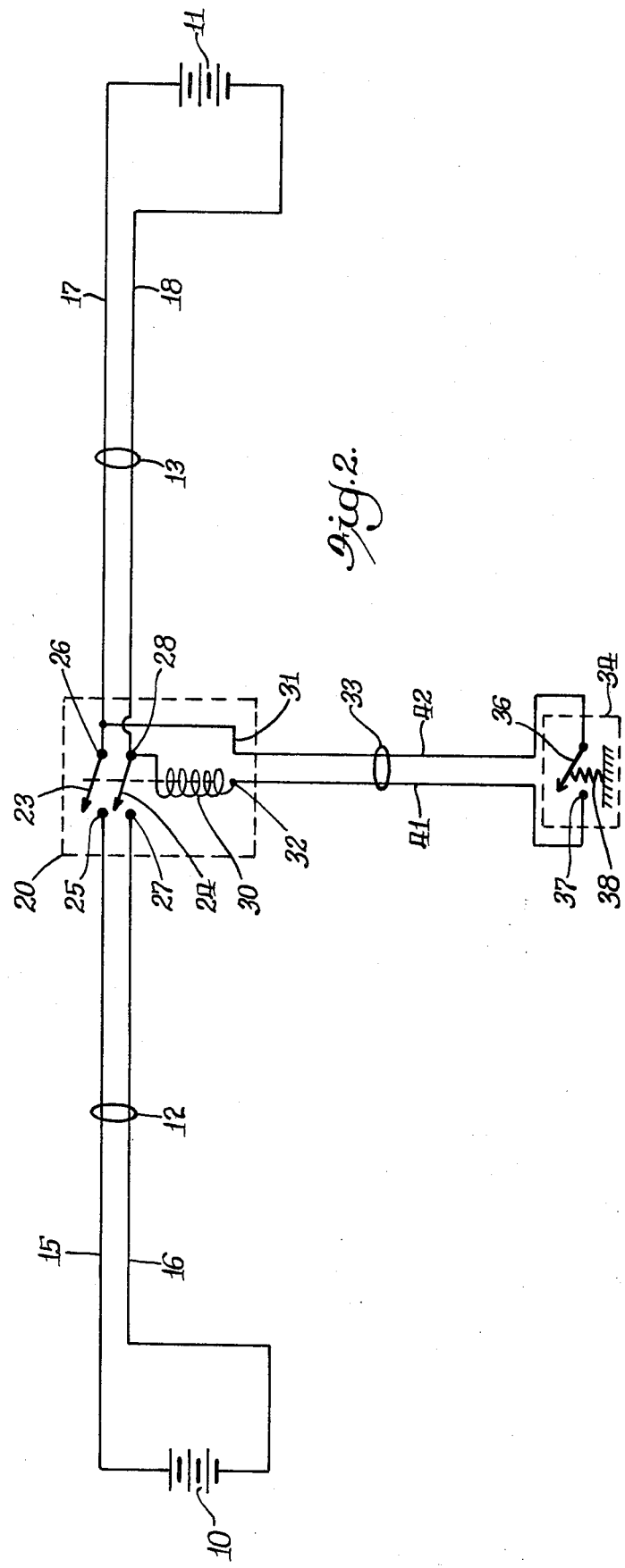

SAFETY JUMPER CABLES

BACKGROUND AND SUMMARY OF THE INVENTION

Jumper cables are used to connect the relatively weak battery, incapable of starting the engine in the vehicle in which it is located, to a relatively strong battery in another automotive vehicle. Essentially the jumper cables are nothing more than two wires capable of carrying the current involved, with clips at each end of each of the wires to releasably engage the terminals on the batteries involved.

In the use of such conventional cables there is a very serious danger to the persons who are making this temporary connection between the two batteries through the use of the cables. This danger is occasioned by the fact that the storage batteries conventionally employed in automotive vehicles give off hydrogen. That hydrogen in the presence of the ambient air can produce explosive atmospheres. Such explosive atmosphere may be present within the battery case as well as immediately adjacent the battery. It is not uncommon for the hydrogen outside of the battery to ignite and in turn ignite the hydrogen within the battery, causing the battery to explode. When the battery explodes the acid within the battery is thrown about and can cause serious burns to personnel involved. People have had eye damage result from being splashed with acid from batteries so exploding. What happens is that in making the temporary connections through the use of the jumper cables, a spark occurs between the last of the four clips being connected and the battery terminal to which that last connection is made. The battery terminal is, of course, on the battery and thus in close proximity to the hydrogen that may be present around that battery. While the manufacturers and vendors of battery cables usually supply instructions warning users to make the last connections at a point remote from the battery, e.g., perhaps at a location on a frame of the vehicle (the frame being connected in the vehicle to a "grounded" battery terminal), such instructions are often disregarded with serious consequences.

The principal object of the present invention is to provide a battery cable assembly by which it is virtually impossible to create a spark at a location at which the battery hydrogen will be present. Thus even though the user of the cable is careless or inattentive in making the battery connections with the cable, that person's actions will not result in a battery explosion. This is achieved by using a relay intermediate the ends of the battery cable. Since the relay contacts are normally open there is no possibility of the battery cables carrying current while the cable is being connected to, or disconnected from, the battery. After such connections to the batteries have been made, a remote push button switch is actuated to energize the relay solenoid which acts to close the relay contacts and create electrical connections between the ends of the battery cables. While a spark may occur at the relay contact this is at a location remote from the batteries and inside a relay case and thus at a location where it is virtually impossible for any of the battery hydrogen to be present. The fact that the relay is approximately centered between the ends of the battery cables necessarily dictates that it be remote from the two batteries involved, since the size and configuration of the vehicles involved necessarily dictates a substantial distance between the ends of the jumper cable. This fact in association with the overall length of the jumper cable will virtually prevent a person from locating the relay closely adjacent one of the batteries.

A further advantage in embodiments of the invention reside in the presence of the push button switch for actuating the relay at the end of a cable which connects to the relay. This permits, for example, a person to be in the driver's seat of the disabled vehicle and operate the engine controls of that vehicle at the same time that the switch is being actuated to connect the two batteries.

DESCRIPTION OF THE DRAWINGS

FIG. 1 is a diagrammatic illustration of an embodiment of the invention employed in connection with the batteries of two vehicles; and FIG. 2 is a schematic illustration of the electrical circuitry of FIG. 1.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In FIG. 1 there are two vehicles A and B. Each of these vehicles has an internal combustion engine (not shown) with the electrical systems thereof being powered by batteries 10 and 11 respectively. For the purposes of illustration, it will be assumed that the battery 10 of vehicle A is so weak that it does not have sufficient power to start the engine of that vehicle. Battery 11 of vehicle B is in good condition, i.e., relatively strong, and vehicle B has been driven to a position in proximity to vehicle A so that a jumper cable can be used to electrically connect the two batteries. This will, of course, permit the engine of vehicle A to be started using electrical power from battery 11 of vehicle B. Today such batteries conventionally are twelve volt, "wet" storage batteries.

The jumper cable of the present invention includes two lengths of two wire electrical cables 12 and 13. Each of these two cables are approximately ten feet long. Cable 12 comprises two wires 15 and 16 in a green colored sheath. Cable 13 comprises two wires 17 and 18 in a red colored sheath. Other means, rather than the coloring of the sheath, may be employed for distinguishing between the two cables, such as indicia on the sheath, etc. The cables are secured to a relay case 20 as by means of strain relief clamps (not shown). The cables are of approximately equal length. Wires 15–18 are sufficiently heavy to carry the current required, e.g., number 4 or number 2 wire. At the ends of the wires remote from the relay are clips 21. As is conventional with such clips, they are color coded so that the user can tell whether they are to be connected to the positive or negative terminal of the battery.

A relay within the relay case 20 consists of a pair of normally open switches 23 and 24. Wires 15 and 17 connect to connections or contacts 25 and 26 associated with switch 23. Wires 16 and 18 connect to connections or contacts 27 and 28 associated with switch 24. The relay has a solenoid 30 which when energized will result in the closing of the switches 23 and 24. The solenoid has a wire or connection 31 going to connection 28 and a wire or connection 32. An electrical cable 33 of about twenty feet in length connects the relay case 20 and the body or case of a push button, momentary contact switch 34. This switch includes a movable contact 36 and a fixed contact 37. The movable contact is biased to the switch-open position by a spring 38. A plunger 39 protruding from the body is engageable with the movable contact 36 so that when the plunger is depressed the movable contact is displaced to the switch-closed position, in engagement with the fixed contact 37. Within cable 33 are two wires 41 and 42. Wire 41 extends between the solenoid connection 32 and the fixed switch contact 37. Wire 42 connects switch contact 36 to wire 17.

After the two vehicles A and B are brought into proximity and the clips 21 are actuated to engage the terminals of the respective battery, the polarity of the wires and terminals of course must be observed. Also, it is necessary that the cable identified by the color red (or other indicia, etc.) be used in making the connection to a relatively strong battery. After the battery connections have been completed, push button 39 is depressed to close switch contacts 36 and 37. This results in a series electrical circuit being completed from battery 11 through the solenoid 30. Of course, that series circuit will exist only so long as the push button 39 is held down and the term "momentary contact switch" is employed herein that sense of an electrical connection existing in the switch only so long as the actuator 39 is physically displaced. With solenoid 30 energized the switches 23 and 24 are closed, thus completing the electrical circuit between the two batteries. A starter, etc., of vehicle A now can be operated in the normal manner in the effort to start the engine of that vehicle.

We claim:

1. In a jumper cable for use in connecting a relatively weak twelve volt battery in a first automotive vehicle with a relatively strong twelve volt battery in a second automotive vehicle and comprising elongated wire means having clips at each end for engaging the battery terminals of the respective batteries, the improvement comprising:

a relay comprising normally open contact means for completing an electrical circuit when closed and a solenoid having two connections, said contact means comprising a pair of normally open switches, said solenoid being effective when energized by twelve volt direct current to cause said contact means to close;

said wire means comprising a first pair of wires having two ends and with clips at one of said ends for connection to the battery of the first vehicle and a second pair of wires having two ends and with clips at one of said ends thereof for connection to the battery of the second vehicle, the other ends of said wires being connected to said contact means so that when said contact means is closed an electrical circuit is completed between the two batteries through said wires, a first wire of each pair of wires being connected to one of the switches and a second wire of each pair of wires being connected to the other of the switches, the other end of one of the second pair of wires being connected to one of the solenoid connections, each pair of wires being approximately of equal length whereby the relay will be located intermediate the vehicles;

a normally open, momentary contact switch having two connections and being of a size suited for holding in a person's hand; and a two wire cable comprising a first wire connecting the other of the solenoid connections with one of the momentary contact switch connections, and a second wire of said cable connecting the other of the momentary contact switch connections with the other end of the other wire of the second pair of wires;

whereby while said clips are being connected to the batteries and said relay solenoid is de-energized an electrical circuit between the batteries will not be completed, and after said clips are all connected to the batteries said solenoid can be energized by closing said momentary contact switch with any spark that then occurs being at the relay or the momentary contact switch and thus remote from the batteries.

* * * * *